United States Patent [19]

Snee

[11] Patent Number: 5,007,994
[45] Date of Patent: Apr. 16, 1991

[54] WATER PURIFICATION SYSTEM

[76] Inventor: Thomas M. Snee, 1561 Rustic Hills Dr., Eagan, Minn. 55121

[21] Appl. No.: 273,463

[22] Filed: Nov. 18, 1988

[51] Int. Cl.$^5$ ............................................. C02F 1/461
[52] U.S. Cl. ..................................... 204/240; 204/276; 210/97; 210/243; 210/290
[58] Field of Search ............... 204/149, 152, 240, 275, 204/276; 210/668, 748, 243, 266, 283, 290, 97

[56] References Cited

U.S. PATENT DOCUMENTS

| | | | |
|---|---|---|---|
| 2,162,809 | 6/1939 | Groak et al. | 210/290 |
| 4,525,253 | 6/1985 | Hayes et al. | 204/275 |
| 4,680,114 | 7/1987 | Hayes | 210/243 |
| 4,710,282 | 12/1987 | Chak et al. | 204/272 |

Primary Examiner—Ivars Cintins
Attorney, Agent, or Firm—Moore & Hansen

[57] ABSTRACT

An apparatus for water purification, and in particular for electrical water purification in combination with a filtering apparatus for providing purified water for drinking and other application common in the home, farm or business. Metal, hydrogen and oxygen ions are introduced into water to be purified by carbon and copper electrodes. After ionizing the water to be purified, the water is then filtered in a filter tank which contains layers of various filtration media, including granular activated carbon.

8 Claims, 1 Drawing Sheet

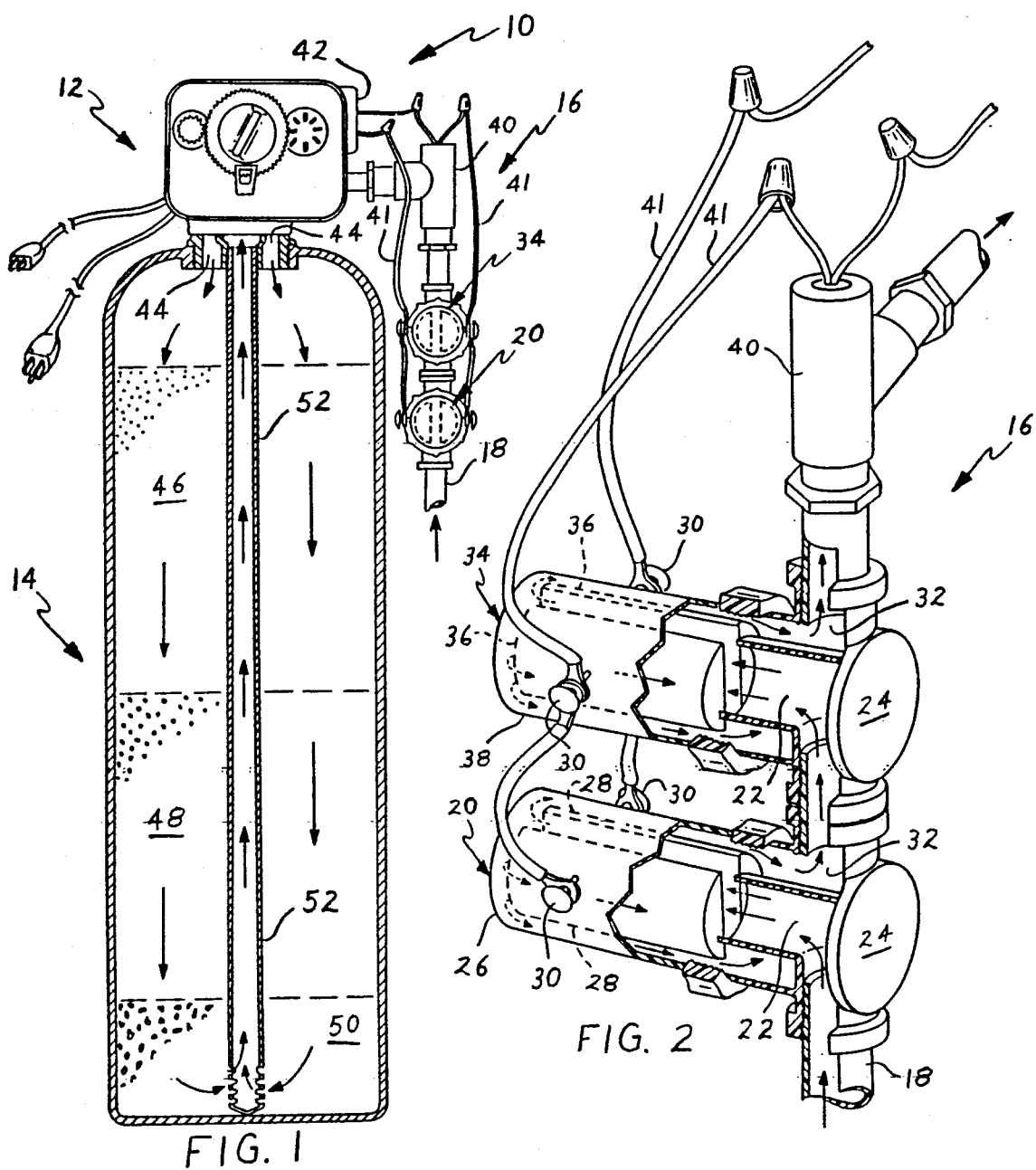
FIG. 1
FIG. 2
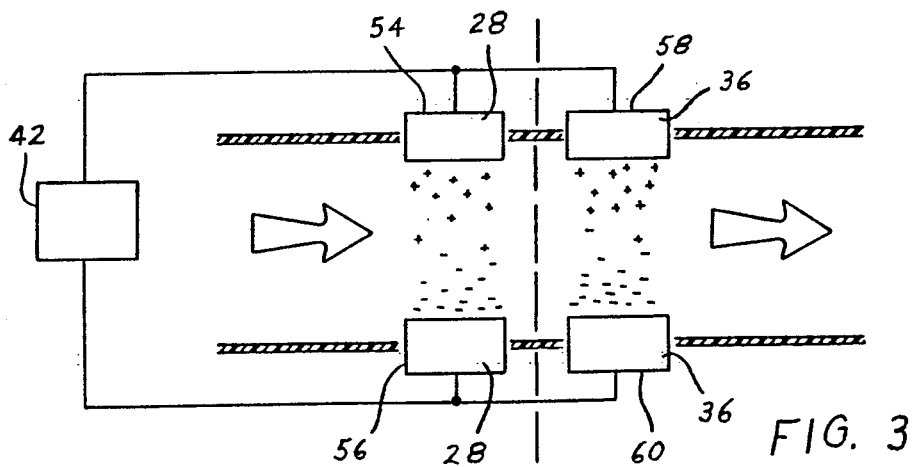
FIG. 3

WATER PURIFICATION SYSTEM

BACKGROUND OF THE INVENTION

1. Field of the Invention

This invention relates to the field of water purification, and in particular to an electrical water purification apparatus in combination with a filtering apparatus for providing purified water for drinking and other applications common in the home, farm or business, as well as purifying water in industrial and municipal water treatment plants.

2. Background Information

The use of an ionization chamber or chambers is known in the art. However, many prior art applications use electrodes of various alloys, including silver and copper, to control algae and bacteria. The use of filtering equipment has also been known in the art for removing various forms of particulate impurities.

Among the most common forms of filtering purification systems are those known as salt water softeners, also known as ion-exchange systems. While these softeners are useful for removing some calcium, which contributes to scale buildup in pipes and water heaters, for example, they fail to kill bacteria, virus and algae, they add salt to the system, and they require frequent maintenance. Further, they fail to remove chlorine and other toxic chemicals, lead, radon or radium. These softeners also fail to remove foul tastes and odors, and do little to remove iron from the water. Finally, salt water softeners remove healthy forms of calcium and replace it with sodium.

Prior patents dealing with the problem of electrical water purification include U.S. Pat. No. 4,525,253 issued to Hayes et al on June 25, 1985. Hayes et al teaches the use of electrodes of a copper/silver/nickel alloy. The reference, which is contemplated mainly for swimming pools and other outdoor water storage areas, is directed to removal of algae and bacteria without the use of chlorine, but does not claim to aid in the removal of toxic chemicals, metals or gases. Further, the presence of silver in drinking water may lead to health problems. Like the Hayes et al reference, U.S. Pat. No. 4,680,114 issued to Hayes on July 14, 1987 teaches the use of silver and copper/silver alloyed electrodes, as well as copper electrodes. However, the Hayes electrodes are designed for use in large holding tanks, and the configuration claimed by Hayes does not include any type of filtration system.

U.S. Pat. No. 4,263,1 issued to Shindell on Apr. 21, 1981, discloses the use of electrodes in the presence of added salt to destroy organic matter, especially in swimming pools and spas. However, the addition of salt to a system for treating drinking water and water used for other ordinary indoor uses is frequently inappropriate as salt water can be bad for plants, and the addition of excess sodium to drinking water may be detrimental to human health.

With this background in mind, a water purification system using electrodes and activated carbon filtration has been developed.

SUMMARY OF THE INVENTION

It is an object of this invention to provide an efficient, low-maintenance means for purifying water intended for household use, both for the benefit of those consuming or using the water, but also to prolong the useful lift of household appliances which may be adversely affected by the effects of corrosion or scaling due to continuous exposure to unpurified water. It is a further object to provide these benefits to users of the invention in farm and business applications as well.

Other objectives of the invention include the elimination of iron and odors from the water. Attaining these objectives by the use of copper electrodes is accomplished by the creation of hydrogen ions by the negatively-charged cathode of the electrode, and the creation of copper ions and some oxygen ions by the positively-charged anode. These same reactions are largely true of the carbon electrodes as well, although the carbon anode creates mainly oxygen ions and, in acidic water—i.e., water of pH under 7.0—will contribute to the breakdown of sulfide gas into sulfur particles, as will the copper anode in acidic water. It is the sulfide gas which is responsible for much of the odor sometimes found in tap water. The excess oxygen ions combine with dissolved iron and manganese which are, as the sulfur particles, later filtered and removed in the filter tank. Since the appearance of iron is more likely in well water than in water provided in municipal water systems, the carbon electrodes, which produce a far greater amount of oxygen ions than the copper electrodes, are not always necessary in the use of this system.

A further object of the invention is the elimination of algae and bacteria from water. These algae and bacteria are also responsible for odors in the water, as well as for a slimy coating which may develop where quantities of water are left standing for extended periods, as in toilet tanks. The copper ions created by the electrodes kill off algae and bacteria, which are then removed from the water in the filter tank. The filter tank contains three layers of filtering media or materials: activated carbon; birm (magnesium oxide); and gravel, which may include oyster shells or some other calcite, The activated carbon layer is especially effective in filtering the dead algae and bacteria. The layer of birm is more effective in the removal of iron particles.

A further object of the invention is the provision of calcium to the tap water in a form usable by the human body, while at the same time reducing forms of calcium which contribute to the scaling of pipes, water heaters, and the like. Calcium bicarbonate, $Ca(HCO_3)$, is the soft form of calcium. This is the form of calcium most readily used by plants, animals and humans. Calcium carbonate, $CaCo_3$, is the form of calcium considered "hard," and which causes scale. In the presence of heat, as in a water heater, bicarbonate ions break down into carbonate ions. The ion chambers, however, also put excess hydrogen ions and free electrons in the water. The excess hydrogen ions help the bicarbonate ions hold onto their hydrogen atoms and not convert into carbonate ions when heated. The action of these ions produced by the copper electrodes similarly tends to reduce existing hard scale as well as controlling its formation, which is especially useful in applications such as with coffee vending machines, ice makers, boilers, and other uses where scale buildup is of primary concern. Certain of these applications will not require the use of the filter tank as space limitations or other requirements may dictate.

Another object of the invention is the removal of chlorine and other toxic contaminants from the water. Chlorine is corrosive to pipes and equipment to which it is exposed. It has also been linked to many health concerns. Yet it is frequently added to municipal water systems to treat water. Other toxic contaminants may be found in the ground water as well. Activated carbon adsorbs—i.e., attracts and adheres—many man-made chemicals, including fertilizers, pesticides, herbicides and cleaning compounds, as well as chlorine.

These and many other objects and advantages of the invention will be readily understood as the following description is read in conjunction with the accompanying drawings, wherein like reference numerals have been used to designate like elements throughout the several views.

BRIEF DESCRIPTION OF THE DRAWINGS

FIG. 1 is a section view of the filter tank showing the ionization chambers and the pressure switch attached thereto;

FIG. 2 is a fragmentary side elevation view on a larger scale showing the ionization chambers; and FIG. 3 is a schematic illustration of the ionization chambers.

DESCRIPTION OF THE PREFERRED EMBODIMENT

With reference to the drawings, and in particular to FIG. 1, the water purification system of the present invention is generally indicated by reference numeral 10. The major elements of the system are the filter tank 14 and the ionization system 16, the filter tank 14 having a control unit 12 mounted thereon.

Incoming water to be purified enters the water purification system 10 through incoming water supply line 18. Water entering the system for purification may be from either a local well, as in many rural applications, or it may be supplied by a municipal water system. As water to be purified is introduced into the water purification system 10, it first encounters the ionization system 16, shown most clearly in FIG. 2. In the instance where the water to be purified is from a local well or other water supply with an unusually high level of iron or other similar minerals such as manganese, a secondary ionization chamber 20 will be provided through which the water will initially enter the system. Flow arrows represent the general direction of flow of the water to be purified in the system. As may be seen in FIG. 2, water enters the secondary ionization chamber 20 through the inlet port 22 of a commercially available modified T joint 24. The T joint 24 directs the flow of water into the secondary ionization chamber 20, which contains two pure carbon or carbon/graphite electrodes 28 attached to the secondary ionization chamber housing 26 by means of conductive screws 30. In the preferred embodiment, the carbon electrodes 28 are simply solid carbon or carbon/graphite bars. After flowing through the secondary ionization chamber 20 as depicted by the flow arrows, the water exits the secondary ionization chamber 20 via the outlet port 32 of the modified T joint 24.

Still referring to FIG. 2, in systems where water to be purified has already been treated by a municipal water system, or where the water has already circulated through the secondary ionization chamber 20, water enters ionization chamber 34 through the inlet port 22 of a second modified T joint 24. As with the secondary ionization chamber 20, the T joint 24 directs the flow of water into ionization chamber 34, which contains two pure copper electrodes 36 attached to the ionization chamber housing 38 of ionization chamber 34 by means of conductive screws 30. In the preferred embodiment, the copper electrodes 36 are simply solid copper bars. After flowing through the copper electrode ionization chamber 38 as depicted by the flow arrows, the water exits the copper electrode ionization chamber 38 via the outlet port 32 of the modified T joint 24.

The electrodes 28 and 36 are activated by means of a pressure switch 40. As water flowing through the system is detected by the pressure switch 40, a circuit therein is closed providing electrical power to the electrodes 28 and 36 by means of a wire 41 connecting the conductive screws 30 with the source of the electrical power, an ion controller located on the back of the control unit 12. The ion controller is represented schematically in FIG. 3 with reference numeral 42. This ion controller 42 converts conventional AC power to DC, and reverses the direction of the DC current approximately every five minutes to minimize electrode wear. The electrical current supplied by the ion controller 42 results in a level of approximately 0.5 ppb (parts per billion) of copper in the water as supplied by the copper electrodes 36. The pressure switch 40 may be located either between the primary ionization chamber 34 and the filter tank 14, or, where high levels of corrosive contaminants are found in the water to be purified, it may be located on the water line containing purified water leaving the filter tank. In certain applications the pressure switch 40 will not be used, as in where the supply of DC current is tied in to the activation of a pump supplying water for the structure being serviced.

After passing through the ionization system 16, water undergoing purification enters the filter tank 14 via a filter tank inlet port 44. In the preferred embodiment, there are three layers, or regions, of filtration media in the filter tank 14. Referring to FIG. 1, the first and uppermost layer 46 comprises granular activated carbon. This is the first layer of filtration media encountered by the water being purified. The second layer of filtration media 48 is comprised of magnesium oxide ($Mg_2O_3$), or birm. The third and final layer of filtration media 50 comprises gravel. In the preferred embodiment, oyster shells or some other calcite may be blended with the gravel. In the preferred embodiment there are no membranes or other barriers dividing the various regions of filtration media in the filter tank. These are unnecessary as the various layers maintain their relative positions due to the effect of their relative densities and masses. After passing through the various layers of filtration media, the water undergoing purification is drawn into the purified water distributor 52 and drawn out of the tank, from which it departs through the filter tank outlet port, and goes on to enter the water system of the structure in which it is located.

The control unit 12 is activated by an integral timer. The timer periodically activates the control unit 12, which initiates a backwash, or regeneration, cycle within the filter tank. The backwash cycle is required to remove any substances that have been filtered out of the purified water during purification which have been trapped in the layers of filtration media. Backwash is accomplished automatically by forcing water down the distributor 52 and then through the layers of filtration media in a direction opposite to that of the flow arrows shown in FIG. 1. The backwash fluid is then forced out of the system through a drainage valve which is linked directly to the sewer system by means of a small hose. During the backwash cycle, a valve in the control unit 12 is closed, thereby not allowing any of the backwash to be inadvertently forced into the water supply of the system for which the water is being purified.

In operation, when water is drawn from the system being serviced by the water purification system of the invention, as from a household faucet, water is thereby drawn through the water purification system. This flow of water is detected by the pressure switch 40, and DC electrical current is then provided to the ionization chambers from the ion controller 42 located in the control unit 12. Where a secondary ionization chamber 20 has been installed as part of the water purification system 10, the activation of the carbon electrodes 28 causes the generation of hydrogen ions by the carbon cathode 54 and oxygen ions by the carbon anode 56, as represented schematically in FIG. 3. Likewise, the activation of the copper electrodes 36 causes the generation of hydrogen ions by the copper cathode 58 and oxygen and copper ions by the copper anode 60. The oxygen ions generated by the anodes combine with dissolved iron and manganese in the water to be purified which are, as the sulfur particles, later filtered and removed in the filter tank. Likewise, the hydrogen ions help calcium bicarbonate ions hold onto their hydrogen atoms and not convert into calcium carbonate ions when heated. This is beneficial because calcium carbonate tends to contribute to the scaling of water heaters, pipes and other plumbing appliances. Further, "neutral" particles like silica or alumina tend to pick up a negative charge as they pass by the electrodes. Normally these particles help form hard scale by binding calcium and magnesium carbonate together. However, the negative charges they pick up from the electrodes cause the particles to repel each other and prevent the binding effect. The copper ions created by the electrodes kill off algae and bacteria, which are then removed from the water in the filter tank. Likewise, these copper ions also tend to strip the bonding properties of the existing hard scale within pipes and fixtures, and thereby reduce the scale as it wears away over time.

After passing through the ionization system 16, the water to be purified enters the filter tank 14. In the filter tank 14, the water passes through the granular activated carbon layer 46, then the magnesium oxide layer 48, and finally the gravel/calcite layer 50. While passing through the granular activated carbon layer 46, the water deposits chlorine, VOC's (volatile organic chemicals), and many other contaminants. This layer is effective because most natural and man-made organic chemicals and living matter, like algae, are partly composed of carbon atoms, allowing activated carbon to attract in these chemicals. Activated carbon is also effective in removing radon gas from water. The magnesium oxide layer 48 is most effective in the removal of iron particles. The gravel/calcite layer 50 serves to help maintain a neutral or higher pH balance for water that has been purified by the system, as well as helping to maintain a relatively high level of beneficial calcium bicarbonate, and a relatively low level of calcium carbonate, which leads to calcium hardness or scaling in pipes and plumbing appliances.

After filtering through these regions of the filter tank 14, the now purified water enters the water distributor 52, and is drawn into the water system of the establishment being serviced.

It is important that the backwash cycle be operated on a periodic basis. The control unit 12 contains a timer which permits the backwash cycle to run on a predetermined bases. This is important because the backwash cycle serves to remove contaminants that have accumulated in the various layers of filtration media in the filter tank 14. If contaminants are allowed to build up, the filtration media will become ineffective, allowing contaminants to pass through the filter tank and into the water system.

Since various water systems may have specific needs or problems with which to deal in various applications, the water purification system 10 may be varied in certain particulars, including the size of the filter tank 14 and the relative amounts of filtration media placed within the filter tank 14. It is anticipated that various changes may be made in the size, shape, and construction of the water purification system disclosed herein without departing from the spirit and scope of the invention as defined by the following claims.

What is claimed is:

1. A water purification apparatus, comprising:
   an ionization chamber containing two spaced apart ion-producing electrodes and having an inlet port and an outlet port, said inlet port being connected to an incoming water line for supplying pressurized water to be purified to said chamber, and said inlet port and said outlet port being so arranged in separate, fluid flow communication with said chamber that pressurized water to be purified from said incoming water line will pass through said inlet port and circulate about said ion-producing electrodes before flowing out of said chamber through said outlet port;
   said ion-producing electrodes of said ionization chamber are made of pure copper;
   a tubular connecting means having a first end and a second end, said first end communicating with said outlet port of said ionization chamber; and
   a filter tank containing a first layer of granular activated carbon and a second layer comprised of gravel, said gravel including calcites mixed therewith, said filter tank having at least one inlet port and at least one outlet port and flow passage means directing water first through said layer of granular activated carbon and thereafter through said second layer, said second end of said connecting means communicating with said inlet port of said filter tank, whereby said water to be purified from said incoming water line passes through said ionization chamber before entering said filter tank, and then passes first through said layer of granular activated carbon and thence through said second layer before being discharged from said filter tank in a purified state.

2. The water purification system as defined in claim 1 wherein:
   said pure copper electrodes of said ionization chamber comprise solid copper bars.

3. The water purification system as defined in claim 1 further comprising:
   a pressure switch positioned serially between said filter tank and said ionization chamber in said tubular connecting means, whereby when said pressure switch detects the flow of water through said tubular connecting means, electrical current is supplied to said electrodes of said purification system.

4. A water purification apparatus, comprising:
   an ionization chamber containing two spaced apart ion-producing electrodes and having an inlet port and an outlet port, said inlet port being connected to an incoming water line for supplying pressurized water to be purified to said chamber, and said inlet port and said outlet port being so arranged in separate, fluid flow communication with said chamber that pressurized water to be purified from said incoming water line will pass through said inlet port and circulate about said ion-producing electrodes before flowing out of said chamber through said outlet port;

a tubular connecting means having a first end and a second end, said first end communicating with said outlet port of said ionization chamber;

a filter tank containing a layer of granular activated carbon and other layers of insoluble natural minerals, said filter tank having at least one inlet port and at least one outlet port, said second end of said connecting means communicating with said inlet port of said filter tank, whereby said water to be purified from said incoming water line passes through said ionization chamber before entering said filter tank, and then passes through said layer of granular activated carbon and said other layers of insoluble natural minerals before being discharged from said filter tank in a purified state; and said filter tank contains first, second and third layers of filtration material, said first layer of filtration material comprises said granular activated carbon, and said second layer comprises magnesium oxide, said filter tank further including flow passage means whereby said water to be purified flows sequentially through said first, second and third layers of said filtration material.

5. The water purification system as defined in claim 4 wherein:
said third layer of filtration material in said filter tank comprises gravel.

6. The water purification system as defined in claim 5 wherein:
said gravel includes calcites.

7. A water purification apparatus, comprising:
an ionization chamber containing two spaced apart ion-producing electrodes and having an inlet port and an outlet port, said inlet port being connected to an incoming water line for supplying pressurized water to be purified to said chamber, and said inlet port and said outlet port being so arranged in separate, fluid flow communication with said chamber that pressurized water to be purified from said incoming water line will pass through said inlet port and circulate about said ion-producing electrodes before flowing out of said chamber through said outlet port;

a tubular connecting means having a first end and a second end, said first end communicating with said outlet port of said ionization chamber;

a filter tank containing a layer of granular activated carbon and other layers of insoluble natural minerals, said filter tank having at least one inlet port and at least one outlet port, said second end of said connecting means communicating with said inlet port of said filter tank, whereby said water to be purified from said incoming water line passes through said ionization chamber before entering said filter tank, and then passes through said layer of granular activated carbon and said other layers of insoluble natural minerals before being discharged from said filter tank in a purified state; and a secondary ionization chamber with two spaced apart, pure carbon electrodes, said secondary ionization chamber having an inlet port and an outlet port, said secondary ionization chamber positioned in said incoming water line in series with said ionization chamber containing said ion-producing electrodes, said ionization chamber containing said ion-producing electrodes being positioned between said secondary ionization chamber and said filter tank, whereby said water to be purified from said incoming water line flows through said secondary ionization chamber, said ionization chamber containing said ion-producing electrodes and said filter tank before being discharged into the water system for which the water is being purified.

8. The water purification system defined in claim 7 wherein:
said electrodes of said secondary ionization chamber comprise solid carbon bars.

* * * * *